United States Patent
Shimamura et al.

(10) Patent No.: US 8,828,130 B2
(45) Date of Patent: Sep. 9, 2014

(54) EXHAUST GAS TREATMENT SYSTEM EQUIPPED WITH CARBON DIOXIDE REMOVAL DEVICE

(75) Inventors: Jun Shimamura, Kure (JP); Toshio Katsube, Kure (JP); Shigehito Takamoto, Kure (JP); Masaharu Kuramoto, Kure (JP); Naoki Oda, Kure (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 99 days.

(21) Appl. No.: 13/581,920

(22) PCT Filed: Mar. 3, 2010

(86) PCT No.: PCT/JP2010/053400
§ 371 (c)(1),
(2), (4) Date: Sep. 7, 2012

(87) PCT Pub. No.: WO2011/108086
PCT Pub. Date: Sep. 9, 2011

(65) Prior Publication Data
US 2012/0325092 A1    Dec. 27, 2012

(51) Int. Cl.
*B01D 53/14* (2006.01)
*F23J 15/06* (2006.01)
*F23J 15/00* (2006.01)
*F23J 15/04* (2006.01)

(52) U.S. Cl.
CPC ............ *F23J 15/006* (2013.01); *Y02C 10/06* (2013.01); *F23J 15/06* (2013.01); *B01D 2257/504* (2013.01); *B01D 53/1475* (2013.01); *Y02C 10/04* (2013.01); *B01D 2258/0283* (2013.01); *Y02E 20/346* (2013.01); *Y02E 20/363* (2013.01); *F23J 2215/50* (2013.01); *F23J 2215/10* (2013.01); *F23J 2215/20* (2013.01); *F23J 2219/40* (2013.01); *F23J 15/04* (2013.01)
USPC .................. 96/263; 96/266; 95/199; 95/223; 95/227; 95/235; 95/236; 423/228

(58) Field of Classification Search
CPC ........... B01D 257/504; B01D 53/1475; B01D 2258/0283; B01D 53/62; F23J 2215/10; F23J 2215/20; F23J 2215/50; F23J 2219/40; F23J 15/006; F23J 15/04; F23J 15/06; Y02C 10/04; Y02C 10/06
See application file for complete search history.

(56) References Cited

FOREIGN PATENT DOCUMENTS

| JP | 7-241440 A | 9/1995 |
| JP | H07241440 | * 9/1995 |

(Continued)

OTHER PUBLICATIONS

English machine translation of JP 2009 247932.*

(Continued)

*Primary Examiner* — Duane Smith
*Assistant Examiner* — Cabrena Holecek
(74) *Attorney, Agent, or Firm* — Fay Sharpe LLP

(57) ABSTRACT

An object of the present invention is to solve these problems and to provide a exhaust gas treatment system which prevents formation of deposits in a main duct and a flue, on and after the point where the exhaust gases converge, after the removal of $CO_2$ and reduces labor required for maintenance such as cleaning, and thus enabling a long-term operation. Disclosed is an exhaust gas treatment system equipped with a carbon dioxide removal device, comprising a main duct 6 through which an exhaust gas, after treating an exhaust gas from a boiler 1 by a wet desulfurization device, passes; a diverging duct 40 configured to diverge some of an exhaust gas flow from the main duct; an $CO_2$ removal device 20 configured to absorb and remove carbon dioxide ($CO_2$) in the diverged exhaust gas by an amine absorbent; and a return duct 42 configured to converge the exhaust gas, from which $CO_2$ has been removed by the $CO_2$ removal device, with an exhaust gas that has not yet been diverged, wherein the return duct 42, before the point where the exhaust gases converge, is provided with heating means 8 configured to vaporize mist of the amine absorbent in the exhaust gas after convergence.

10 Claims, 1 Drawing Sheet

(56) References Cited

FOREIGN PATENT DOCUMENTS

| JP | 10-33938 A | 2/1998 |
| JP | 3486220 B | 1/2004 |
| JP | 2009 247932 | * 10/2009 |
| JP | 2009-247932 A | 10/2009 |

OTHER PUBLICATIONS

English machine translation of JP H07241440.*

English machine translation of JP 2009 247932; translated Feb. 7, 2014.*

English machine translation of JP H07241440 ; translated Feb. 7, 2014.*

International Search Report of International Application No. PCT/JP2010/053400 dated Apr. 6, 2010.

* cited by examiner

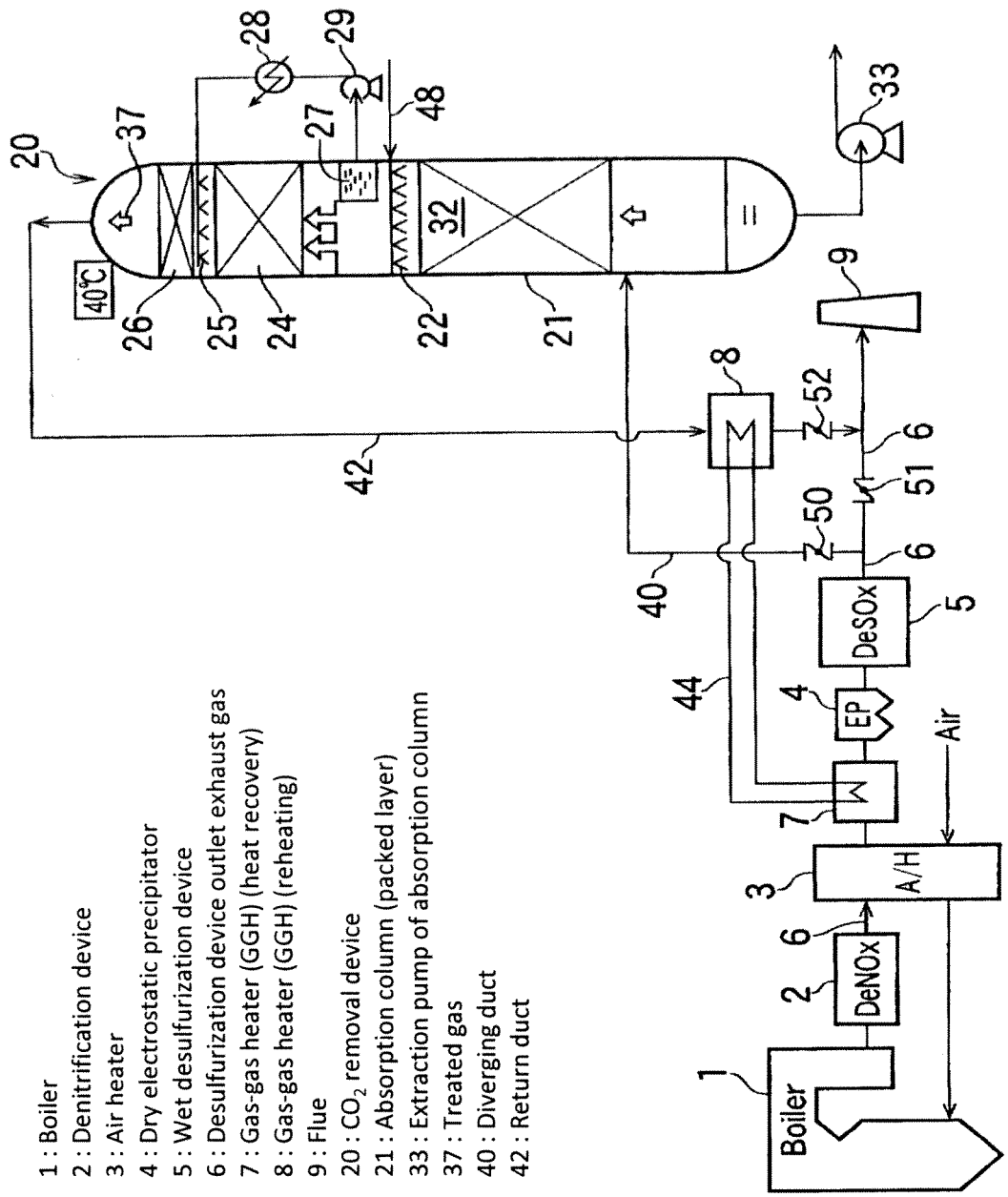
1 : Boiler
2 : Denitrification device
3 : Air heater
4 : Dry electrostatic precipitator
5 : Wet desulfurization device
6 : Desulfurization device outlet exhaust gas
7 : Gas-gas heater (GGH) (heat recovery)
8 : Gas-gas heater (GGH) (reheating)
9 : Flue
20 : $CO_2$ removal device
21 : Absorption column (packed layer)
33 : Extraction pump of absorption column
37 : Treated gas
40 : Diverging duct
42 : Return duct

EXHAUST GAS TREATMENT SYSTEM EQUIPPED WITH CARBON DIOXIDE REMOVAL DEVICE

TECHNICAL FIELD

The present invention relates to an exhaust gas treatment system for removal of carbon dioxide ($CO_2$) in a combustion exhaust gas of power generation facilities and the like, and more particularly to an exhaust gas treatment system equipped with a $CO_2$ removal device for removal of $CO_2$ as an exhaust gas using amines as an absorbent.

BACKGROUND ART

In thermal power generation facilities and boiler facilities, a large amount of coal and heavy oil are used as fuels. From the viewpoint of air pollution and global warming, release of carbon dioxide (hereinafter referred to as $CO_2$) into the atmosphere has recently become a problem, and controls on $CO_2$ emissions have been studied worldwide.

Heretofore, there has widely been known, as one of technologies of separating and recovering $CO_2$, a chemical absorption method in which amines (for example, alkanolamine) are used as an absorbent of $CO_2$. In case a boiler of power generation facilities is provided with a $CO_2$ removal device in which an aqueous solution of amines (hereinafter referred to as an amine absorbent) is used, a boiler, a turbine or the like needs to undergo large-scale modification in facilities where the entire amount of a gas is discharged from the boiler. Therefore, there has been employed a so-called partial treatment in which some of an exhaust gas is diverged, introduced into a $CO_2$ removal device and then treated, since the treatment does not require comparatively large-scale modification.

A conventional exhaust gas treatment system equipped with a device for removing $CO_2$ by a partial treatment of such an exhaust gas includes the steps of treating an exhaust gas from a boiler by a wet desulfurization device; introducing some of the exhaust gas into a $CO_2$ absorption column; absorbing and removing $CO_2$ by bringing the exhaust gas into gas-liquid contact with an amine absorbent; treating the exhaust gas using an amine washing device and a demister; allowing the exhaust gas to converge with an original exhaust gas; reheating the exhaust gas so as to prevent discharge of a white smoke in a flue; and releasing the treated exhaust gas into the atmosphere from the flue. This reheating is commonly performed by heat exchange with a high-temperature exhaust gas before entering into the wet desulfurization device (Patent Literature 1).

CITATION LIST

Patent Literatures

Patent Literature 1: JP 3486220 B

SUMMARY OF THE INVENTION

Problems to be Resolved by the Invention

It has been found that, in the above conventional exhaust gas treatment system in which some of an exhaust gas of a main duct from a boiler is diverged and treated by a $CO_2$ removal device, and then the exhaust gas is returned to an original main duct, there are following problems. That is, while operation and suspension of a boiler are repeated, incrustations are formed inside a duct and a flue, where the exhaust gases converge after the removal of $CO_2$, at the downstream side of a wet desulfurization device. While operating for a long time, these incrustations are accumulated and blackened. Furthermore, in case an exhaust gas is reheated, a black tarry substance is formed and the removal of the black incrustations requires lots of time and labor.

An object of the present invention is to solve these problems and to provide a exhaust gas treatment system which prevents formation of incrustations in a main duct and a flue, on and after the point where the exhaust gases converge after the removal of $CO_2$, as mentioned above, and reduces labor required for maintenance such as cleaning, thus enabling a long-term operation.

Means for Solving the Problems

In order to solve these problems, the present inventors have intensively studied and found the followings. That is, if a gas treated by a $CO_2$ removal device is allowed to converge with an exhaust gas of an original main duct at the downstream side of a wet desulfurization device, amine sulfate as a stable compound is formed as a result of a reaction of mist of the remaining amine absorbent with a trace amount of sulfur oxide contained in a gas discharged from a desulfurization device. The amine sulfate is accumulated on an inside wall of an exhaust gas duct and a flue while repeating operation and suspension for a long time and, when exposed to high temperature by reheating, the amine sulfate is polymerized to form a black tarry substance. The reason is considered as follows. Although a demister configured to remove mist of an amine absorbent is provided at an outlet of a $CO_2$ removal device, as mentioned above, it is difficult to recover the entire amount, and also a trace amount of sulfur oxide is contained in an exhaust gas desulfurized by a wet desulfurization device. Based on these findings, the present inventors have succeeded in resolving the above problems by providing the return duct, before the point where the exhaust gases converge, through which a gas treated by a $CO_2$ removal device is returned to a main duct, with heating means configured to vaporize and remove mist of an amine absorbent.

That is, inventions claimed in the present application are as follows.

(1) A exhaust gas treatment system comprising: a main duct through which an exhaust gas passes from a boiler, in which the exhaust gas has been treated by a wet desulfurization device; a diverging duct configured to diverge some of an exhaust gas flow from the main duct; a $CO_2$ removal device configured to absorb and remove carbon dioxide ($CO_2$) in the diverged exhaust gas by an amine absorbent; and a return duct configured to converge the $CO_2$-removed exhaust gas in the $CO_2$ removal device with the exhaust gas that has not yet been diverged in the main duct, wherein the return duct, before the point where the exhaust gases converge, is provided with heating means configured to vaporize mist of the amine absorbent in the exhaust gas after the convergence.

(2) The system according to (1), wherein the heating means further comprising temperature controlling means configured to measure an exhaust gas temperature in the return duct and an exhaust gas temperature in the main duct before the convergence of the exhaust gasses in the main duct, respectively, and to raise the exhaust gas temperature in the return duct such that a difference between these exhaust gas temperatures becomes 5° C. or higher.

(3) The system according to (1) or (2), wherein the heating means is a heat exchanger.
(4) The system according to (3), wherein the heat exchanger is composed of fin tubes that are arranged, and the tube arrangement is staggered arrangement.
(5) The system according to (1) or (2), wherein the heating means is a heat exchanger, in which the heat exchanger uses a heat carrier having heat recovered by a heat exchanger provided at upstream side of the $CO_2$ removal device.
(6) The system according to (3), wherein the heat exchanger provided at the upstream side of the $CO_2$ removal device is a heat exchanger provided in a main duct before divergence of the exhaust gas, and the recovered heat is employed in the heat exchanger provided in the return duct, and the $CO_2$ removal device and/or condensate heating.

The heating means used in the present invention may be heating means capable of raising a temperature of a gas passing through the return duct to a temperature, at which an amine absorbent in an exhaust gas after convergence is vaporized, or higher, and specifically a temperature that is higher than a temperature of exhaust gases that converge in the main duct by 5° C. or higher. The heating means is preferably performed by heat recovery from a high-temperature exhaust gas to be introduced into upstream side of the $CO_2$ removal device, particularly a wet desulfurization device. The heating means includes, for example, a gas-gas heater in which the return duct is provided with a heat exchanger, and the heat exchanger and a heat exchanger provided at the upstream side of the $CO_2$ removal device, preferably a main duct before divergence of an exhaust gas are mutually connected by a heat transfer tube through which a heat carrier circulates. Heat recovered by the heat exchanger provided in the main duct may be optionally used in a $CO_2$ removal device or condensate heating as necessary, in addition to heating of an exhaust gas of the return duct. The heat exchanger is preferably a heat exchanger in which fin tubes are arranged so as to increase heat transfer efficiency. In particular, tube arrangement is preferably staggered arrangement from the viewpoint of effectively vaporizing mist on a tube surface by inertial impaction due to collision of micro mist with a tube.

Advantageous Effects of the Invention

According to the present invention, it is possible to prevent formation of incrustations in a duct due to a reaction of an amine absorbent with sulfur oxide remaining in an exhaust gas by simple means and to reduce labor required for cleaning of a duct and a flue in a system in which some of an exhaust gas of a main duct from a boiler are diverged and treated by a $CO_2$ removal device using an amine absorbent, and then the treated exhaust gas is returned to an original main duct, and thus facilitating maintenance of the system.

BRIEF DESCRIPTION OF THE DRAWINGS

FIG. 1 is a diagram for explaining an example of an exhaust gas treatment system of the present invention.

EXPLANATION OF SYMBOLS

1: Boiler
2: Denitrification device
3: Air heater
4: Dry electrostatic precipitator
5: Wet desulfurization device
6: Desulfurization device outlet exhaust gas
7: Gas-gas heater (GGH) (heat recovery)
8: Gas-gas heater (GGH) (reheating)
9: Flue
20: $CO_2$ removal device
21: Absorption column (packed layer)
33: Absorption column extraction pump
37: Treated gas
40: Diverging duct
42: Return duct

EMBODIMENTS FOR CARRYING OUT THE INVENTION

Outline of a boiler exhaust gas treatment system of the present invention is shown in FIG. 1. This system is mainly composed of a boiler 1, a denitrification device 2, an air heater 3, a heat exchanger (GGH) 7, an electrostatic precipitator 4, a wet desulfurization device 5, and a $CO_2$ removal device 20. The $CO_2$ removal device 20 is composed of a $CO_2$ absorption column 21, an absorbent regeneration column, a reboiler and the like. Only the $CO_2$ absorption column 21 is shown in the drawing and the others are not shown. A main duct 6 of a wet desulfurization device 5 outlet exhaust gas is provided with a diverging duct 40 through which some of an exhaust gas is introduced into the $CO_2$ absorption column 21 and then treated, and a return duct 42 through which the gas treated by the $CO_2$ absorption column 21 is allowed to converge with an original main duct. In the vicinity of the converge point of the return duct 42, a heat exchanger 8 is provided as a heater for vaporizing mist of an amine absorbent remaining in an exhaust gas that passes through the return duct 42. Between this heat exchanger 8, and a heat exchanger 7 provided in the main duct before divergence of the exhaust gas, a heat transfer tube 44 through which a heat carrier is circulated is provided, and a heat carrier is circulated by a pump (not shown) and a gas in the return duct 42 to be returned to the main duct 6 is heated by the heat exchanger 8. In the absorption column 21, there are provided a $CO_2$ absorption section (packed bed) 32 where $CO_2$ in the exhaust gas is absorbed to the amine absorbent; a washing section 24 and a water spray section 25 where, in the case of absorbing $CO_2$ in the exhaust gas by a absorbent spray section 22 where an amine absorbent 48 is sprayed, a decarbonized gas whose temperature has been raised by an exothermic reaction is cooled and also an absorbing liquid entrained in the exhaust gas is washed; a water reservoir section 27 where wash water is stored; a cooler 28 configured to cool the circulating wash water; and a pump 29 configured to circulate wash water. A demister 26 is disposed at the upper section of the washing section 24, and mist of the amine absorbent that passed through the washing section is removed. Symbols 50 to 52 each denotes a valve provided in the duct.

In such a system, regarding an exhaust gas generated by combustion of coal or the like by a boiler 1, $NO_x$ (nitrogen oxide) contained in the exhaust gas is removed by a denitrification device 2, and then the temperature is decreased to, for example, 200° C. to 160° C. by an air heater 3. Furthermore, the exhaust gas is introduced into a heat recovery device 7, where heat is recovered by a heat carrier circulating in the heat recovery device 7 and, after cooling to 90 to 130° C., soot dust is removed by an electrostatic precipitator 4. Regarding the gas from which dust has been removed, sulfur oxide ($SO_2$) is removed by a wet desulfurization device 5, and then some of the exhaust gas is introduced into an absorption column 21 of a $CO_2$ removal device 20 from a diverging duct 40. The amount of the exhaust gas to be introduced into the diverging duct 40 is usually at most about 60% of the amount of the exhaust gas that passes through a main duct 6, but is not limited thereto. A treated gas 37 to be discharged from a column top of an absorption column 21 passed through a return duct 42 and converges with a gas in an original main duct 6. Before convergence, the gas is heated to a temperature at which mist of an amine absorbent remaining in the gas after convergence is sufficiently vaporized, using a heater 8, and thus mist is completely removed. The gas in the return duct 42, that converges with the gas in the main duct, is heated to the temperature that is higher than that of the gas in the main duct 6 before convergence by 5° C., and preferably by 8° C. When a difference in temperature is lower than 5° C., mist of the amine absorbent may sometimes remain in the gas, resulting in formation of amine sulfate and further adhesion onto a duct or a flue as mentioned above. It is possible to certainly vaporize and remove mist of an amine absorbent in a gas that returns to a main duct from a return duct 42 by detecting the temperature of a gas in a return duct and that of a gas in a main duct before convergence, and adjusting the circulation amount of a heat carrier that passes through a heat transfer tube 44 such that a difference in temperature between these gasses falls within the above temperature range. The temperature of the exhaust gas after convergence is usually 40° C. or higher. In case white smoke may be generated by condensation of moisture when discharged as it is from a flue 9, the temperature is elevated by a reheater provided at the upstream side of the flue 9, before the exhaust gas is released into the atmosphere from the flue.

The amine absorbent, to which $CO_2$ has been absorbed, is fed to a regeneration column (not shown) from a reservoir at the lower section of absorption column 21 using an absorption column extraction pump 33, and then brought into gas-liquid contact with steam that ascends from the lower section of the regeneration column, thereby, $CO_2$ absorbed to an amine absorbent is aerated and the amine absorbent, from which $CO_2$ has been aerated, is recovered from the bottom of the regeneration column after cooling, and returned to an absorption column 21 through a pipe 48, and then reused.

The invention claimed is:

1. An exhaust gas treatment system comprising:
    a main duct through which an exhaust gas passes from a boiler, in which the exhaust gas has been treated by a wet desulfurization device;
    a diverging duct configured to diverge some of an exhaust gas flow from the main duct;
    a $CO_2$ removal device configured to absorb and remove carbon dioxide ($CO_2$) in the diverged exhaust gas by an amine absorbent; and
    a return duct configured to converge the $CO_2$-removed exhaust gas in the $CO_2$ removal device with the exhaust gas that has not yet been diverged in the main duct, wherein the return duct, before the point where the exhaust gases converge, is provided with heating means for vaporizing mist of the amine absorbent entrained in the $CO_2$-removed exhaust gas after the convergence.

2. The system according to claim 1, wherein the heating means comprises a heat exchanger.

3. The system according to claim 2, wherein the heat exchanger is composed of fin tubes that are arranged, and the tube arrangement is staggered arrangement.

4. The system according to claim 2, wherein the system further comprises a heat recovery device placed at an upstream side of the $CO_2$ removal device, and the heat exchanger uses a heat carrier having heat recovered by the heat recovery device.

5. The system according to claim 2, wherein the system further comprises a heat recovery device placed in the main duct before divergence of the exhaust gas, and the recovered heat is employed in the heat exchanger provided in the return duct, and the $CO_2$ removal device and/or condensate heating.

6. The system according to claim 1, wherein the heating means comprises temperature controlling means configured to measure an exhaust gas temperature in the return duct and an exhaust gas temperature in the main duct before the convergence of the exhaust gases in the main duct, respectively, and to raise the exhaust gas temperature in the return duct such that a difference between these exhaust gas temperatures becomes 5° C. or higher.

7. The system according to claim 6, wherein the heating means further comprises a heat exchanger.

8. The system according to claim 7, wherein the heat exchanger is composed of fin tubes that are arranged, and the tube arrangement is staggered arrangement.

9. The system according to claim 7, wherein the system further comprises a heat recovery device placed at an upstream side of the $CO_2$ removal device, and the heat exchanger uses a heat carrier having heat recovered by the heat recovery device.

10. The system according to claim 7, wherein the system further comprises a heat recovery device placed in in the main duct before divergence of the exhaust gas, and the recovered heat is employed in the heat exchanger provided in the return duct, and the $CO_2$ removal device and/or condensate heating.

* * * * *